United States Patent
Tian et al.

(10) Patent No.: US 9,499,409 B2
(45) Date of Patent: Nov. 22, 2016

(54) METAL SILICOALUMINOPHOSPHATE MOLECULAR SIEVE WITH RHO FRAMEWORK STRUCTURE, AND METHOD FOR PREPARING THE SAME

(75) Inventors: Peng Tian, Dalian (CN); Xiong Su, Dalian (CN); Zhongmin Liu, Dalian (CN); Dong Fan, Dalian (CN); Ying Zhang, Dalian (CN); Yue Yang, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 235 days.

(21) Appl. No.: 14/405,957

(22) PCT Filed: Jun. 8, 2012

(86) PCT No.: PCT/CN2012/076625
§ 371 (c)(1),
(2), (4) Date: Dec. 5, 2014

(87) PCT Pub. No.: WO2013/181833
PCT Pub. Date: Dec. 12, 2013

(65) Prior Publication Data
US 2015/0147269 A1    May 28, 2015

(51) Int. Cl.
*C01B 39/54* (2006.01)
*B01J 29/85* (2006.01)
*B01J 20/18* (2006.01)
*B01J 20/30* (2006.01)
*B01J 37/08* (2006.01)

(52) U.S. Cl.
CPC ............ *C01B 39/54* (2013.01); *B01J 20/18* (2013.01); *B01J 20/3078* (2013.01); *B01J 29/85* (2013.01); *B01J 37/082* (2013.01)

(58) Field of Classification Search
CPC ..... C01B 39/54; B01J 20/18; B01J 20/3078; B01J 29/85; B01J 37/082
See application file for complete search history.

(56) References Cited

U.S. PATENT DOCUMENTS

| | | | |
|---|---|---|---|
| 4,440,871 A | 4/1984 | Lok et al. | |
| 4,503,023 A * | 3/1985 | Breck | B01J 29/06 423/715 |
| 2015/0147269 A1* | 5/2015 | Tian | C01B 39/54 423/705 |

FOREIGN PATENT DOCUMENTS

| | | |
|---|---|---|
| CN | 1301593 A | 7/2001 |
| CN | 1301594 A | 7/2001 |
| CN | 1301596 A | 7/2001 |
| CN | 1301597 A | 7/2001 |
| CN | 1301598 A | 7/2001 |
| CN | 101993093 A | 3/2011 |
| EP | 1142833 A1 | 10/2001 |
| WO | 98/29189 A | 7/1998 |

OTHER PUBLICATIONS

Su, X et al. "Synthesis and characterization of DNL-6, a new silicoaluminophosphate molecular sieve with the RHO framework", Microporous and Mesoporous Materials, vol. 144, No. 1-3, pp. 113-119, X028100125, Oct. 2011.
Ocean, Cheung et al. "Silicoaluminophosphates as CO sorbents", Microporous and Mesoporous Materials, vol. 156, pp. 90-96, XP028406184, Feb. 1, 2012.
Robson, et al., "Synthesis and Crystal Structure of Zeolite Rho—A New Zeolite Related to Linde Type A", Adv. Chem, Ser. vol. 121, 1972, pp. 106-115.
Rouse, et al., "Pahasapaite, a Beryllophosphate Zeolite Related to Synthetic Zeolite Rho, From the Tip Top Pegmatite of South Dakota", N. Jb. Miner. Mh, 1987, pp. 433-440.
Harvey, et al., "The Synthesis of Beryllophosphate Zeolites", Zeolites: Facts, Figures, Future, Stud. Surf. Sci. Catal.1989, pp. 411-420.
Gier, et al., "Low-Temperature Synthesis of Hydrated Zinco(Beryllo)-Phosphate and Arsenate Molecular Sieves", Nature, vol. 349, Feb. 7, 1991, pp. 508-510.
Johnson, et al., "Synthesis and Structure of a Microporous Aluminogermanate with the Zeolite Rho Topology", Microporous and Mesoporous Materials, vol. 28, 1999, pp. 139-154.

(Continued)

*Primary Examiner* — David M Brunsman
(74) *Attorney, Agent, or Firm* — Nath, Goldberg & Meyer; Tanya E. Harkins

(57) ABSTRACT

The present invention relates to a metal silicoaluminophosphate molecular sieve MeAPSO with a RHO framework structure and a preparation method thereof. The metal silicoaluminophosphate molecular sieve is characterized in that: the metal atoms are at least one of vanadium, copper, molybdenum, zirconium, cobalt, manganese, magnesium, iron, nickel and zinc. The chemical composition of said metal silicoaluminophosphate molecular sieve in anhydrous state is expressed as: $mR \cdot nMe \cdot (Si_xAl_yP_z)O_2$, where R represents template existed in molecular sieve micropores, m is the molar number of said template per one molar of $(Si_xAl_yP_z)O_2$, $m=0.1 \sim 0.5$; Me represents metal atom entering into said metal silicoaluminophosphate molecular sieve framework, n is the molar number of Me per one molar of $(Si_xAl_yP_z)O_2$, $n=0.001 \sim 0.30$. Said metal silicoaluminophosphate molecular sieve has ion exchange performance and adsorption performance. The catalyst prepared from said metal silicoaluminophosphate molecular sieve can be applicable to multiple hydrocarbon reactions, such as catalytic cracking, reforming, polymerization, alkylation, transalkylation, isomerization, dehydrogenation, hydrogenation and the like.

21 Claims, 1 Drawing Sheet

(56) References Cited

OTHER PUBLICATIONS

Newsam, et al., "Synthesis and Structure Determination of ECR-10. A Gallosilicate Zeolite with the RHO-Framework", J. Phys. Chem., vol. 99, 1995, pp. 9924-9932.

Feng, et al., "Amine-templated Syntheses and Crystal Structures of Zeolite Rho Analogs", Microporous and Mesoporous Materials, vol. 23, 1998, pp. 315-322.

Busca, et al., "Methanol Steam Reforming Over Ex-Hydrotalcite Cu—Zn—Al Catalysts", Applied Catalysis A: General, vol. 310, 2006, pp. 70-78.

Alkordi, et al., "Zeolite-Like Metal—Organic Frameworks as Platforms for Applications: On Metalloporphyrin-Based Catalysts", J. Am. Chem. Soc., vol. 130, 2008, pp. 12639-12641.

Nouar, et al., "Zeolite-Like Metal—Organic Frameworks (ZMOFs) as Hydrogen Storage Platform: Lithium and Magnesium Ion-Exchange and H2-(rho-ZMOF) Interaction Studies", J. Am. Chem. Soc., vol. 131, 2009, pp. 2864-2870.

Wu, et al., "Zeolite RHO-Type New with the Lightest Elements", J. Am. Chem. Soc., vol. 131, 2009, pp. 6111-6113.

Su, et al., "Synthesis and Characterization of DNL-6, a New Silicoaluminophosphate Molecular Sieve with the RHO Framework", Microporous and Mesoporous Materials, vol. 144, 2011, pp. 113-119.

\* cited by examiner

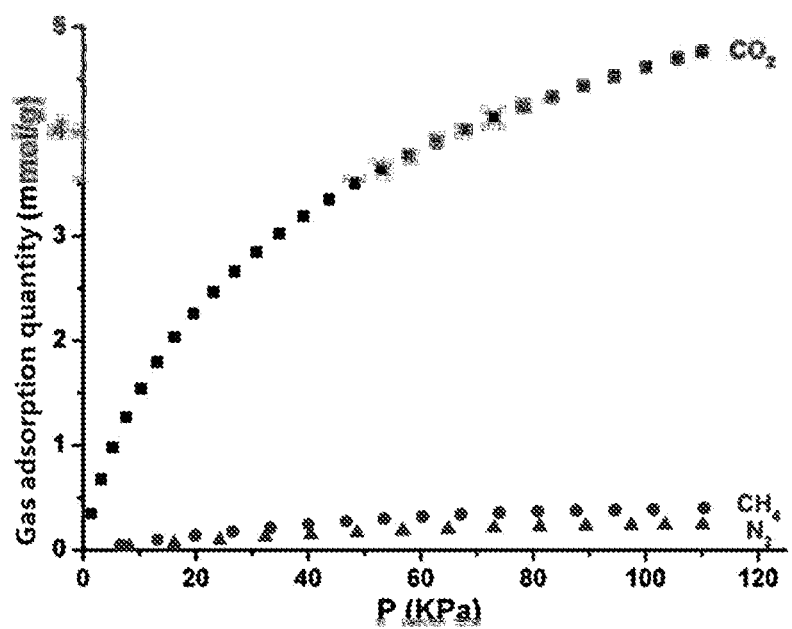

METAL SILICOALUMINOPHOSPHATE MOLECULAR SIEVE WITH RHO FRAMEWORK STRUCTURE, AND METHOD FOR PREPARING THE SAME

This is a National Phase Application filed under 35 U.S.C. 371 as a national stage of PCT/CN2012/076625, filed Jun. 8, 2012, the content of which is hereby incorporated by reference in its entirety.

TECHNICAL FIELD

The present invention concerns a silicoaluminophosphate molecular sieve, and particularly relates to a metal silicoaluminophosphate molecular sieve with RHO framework structure, a preparation method and applications.

BACKGROUND

The synthesis of silicoaluminophosphate molecular sieves with different structures was disclosed in U.S. Pat. No. 4,440,871 in 1984, and these molecular sieves were SAPO-5, SAPO-11, SAPO-16, SAPO-17, SAPO-20, SAPO-31, SAPO-34, SAPO-35, SAPO-37, SAPO-40, SAPO-41, SAPO-42 and SAPO-44. Synthesis of these SAPO molecular sieves is characterized in that a silicon source, an aluminum source, a phosphorus source, and various template agents are employed. The structural units of these SAPO molecular sieves are composed of $PO_2^+$, $AlO_2^-$, and $SiO_2$ tetrahedrons. Among these kinds of molecular sieves, some microporous molecular sieves, such as SAPO-34, have been successfully applied to the MTG process, MTO process and so on, and show excellent catalytic performance. Since then, some silicoaluminophosphate molecular sieves with new structures have been synthesized subsequently. The emersion of SAPO-8, SAPO-36, SAPO-46, SAPO-18, SAPO-39, SAPO-43, SAPO-47, and SAPO-56 enriched the types of silicoaluminophosphate molecular sieve.

Molecular sieve having a RHO framework structure is formed by connecting a cage by double eight-membered rings, belonging to cubic crystal system. The main channel is composed of double eight-membered rings with a pore-opening size of 0.36 nm×0.36 nm. In 1973, Robson, H. E. et al. firstly reported that a silicon-aluminum zeolite with RHO framework structure was synthesized using Na$^+$ and Cs$^+$ as structure directing agents (Adv. Chem. Ser., 121, 106-115). In 1987, Rouse, R. C. et al. reported the discovery of a natural ores having RHO framework structure (N. Jb. Miner. Mh., 1987, 433-440). Henceforth, BePO (Stud. Surf. Sci. Catal., 1989, 49, 411-420), AlGeO (Microporous Mesoporous Mat., 1999, 28, 139-154), BeAsO (1991, Nature, 349, 508-510), and GaSiO (J. Phys. Chem., 1995, 99, 9924-9932) molecular sieves with RHO framework structure were successively synthesized using Na$^+$ and Cs$^+$ as the structure directing agents. In 1998, Feng, P. Y. et al. reported that CoAPO-RHO, MgAPO-RHO, and MnAPO-RHO molecular sieves were synthesized using N,N'-diisopropyl-1,3-propanediamine as template agent (Microporous Mesoporous Mat., 23, 315-322). Hee-Young Jeon, et al. used several microporous molecular sieves with eight-membered ring channels for the synthesis of methylamine and dimethylamine (Appl. Catal. A, 2006, 305, 70-78), and found that RHO zeolite had more than 90% catalytic selectivity for methylamine and dimethylamine, which was the best catalytic selectivity comparing with several other molecular sieves. Mohamed H, Farid Nouar, Tao W, et al. respectively reported that RHO-MOFs were used as hydrogen storage materials and achieved a series of research progress. (J. AM. CHEM. SOC. 2008, 130, 12639-12641; J. AM. CHEM. SOC. 2009, 131, 2864-2870; J. AM. CHEM. SOC. 2009, 131, 6111-6113). Recently, our laboratory has reported the synthesis of SAPO molecular sieves with RHO framework structure (named DNL-6).

DISCLOSURE

An object of the present invention is to provide a metal silicoaluminophosphate molecular sieve with RHO framework structure.

Another object of the present invention is to provide a method for preparing the aforesaid molecular sieves.

Another object of the present invention is to provide a catalyst for acid-catalyzed reaction.

Another object of the present invention is to provide a catalyst for selective oxidation reaction.

Another object of the present invention is to provide a gas absorbent.

In order to achieve the objects, the present invention provides a metal silicoaluminophosphate molecular sieve with RHO framework structure (RHO-MeAPSO), whose chemical composition in anhydrous state can be expressed as:

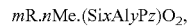

$$mR \cdot nMe \cdot (Si_xAl_yP_z)O_2,$$

wherein R represents a template existed in the micropores of said molecular sieve; R is diethylamine (DEA), a mixture of diethylamine and triethylamine, a mixture of diethylamine and morpholine or a mixture of diethylamine and tetraethylammonium hydroxide, wherein the molar ratio of the diethylamine in the mixture is more than 70%; m is the molar number of said template per one mole of $(Si_xAl_yP_z)O_2$, m=0.1~0.5; Me represents metal atom entering into said metal silicoaluminophosphate molecular sieve framework, n is the molar number of Me per one molar of $(Si_xAl_yP_z)O_2$, n=0.001~0.30; x, y, z respectively represents the molar number of Si, Al, P, wherein x=0.01~0.60, y=0.2~0.60, z=0.2~0.60, and x+y+z=1.

In one preferable aspect, said metal atom Me entering into said metal silicoaluminophosphate molecular sieve framework is one or more metal atoms selected from the group consisting of vanadium, copper, molybdenum, zirconium, cobalt, manganese, magnesium, iron, nickel and zinc.

In one preferable aspect, said metal atom Me is one or more metal atoms selected from the group consisting of copper, cobalt, manganese, magnesium, iron, nickel and zinc.

In one preferable aspect, said metal atom Me is one or more metal atoms selected from the group consisting of copper, cobalt, manganese, magnesium and zinc. In one preferable aspect, said template R is diethylamine, a mixture of diethylamine and triethylamine, a mixture of diethylamine and morpholine or a mixture of diethylamine and tetraethylammonium hydroxide. Preferably, the molar ratio of the diethylamine in the mixture is more than 70%.

The present invention provides a method for preparing said molecular sieve, including the following main steps:

(1) a metal source, a silicon source, an aluminum source, a phosphorus source, a surfactant, a template and deionized water are mixed homogeneously by stirring, and an initial gel mixture is obtained;
the molar ratio of each source in the initial gel mixture is:
Me/Al$_2$O$_3$=0.01~1.0;
SiO$_2$/Al$_2$O$_3$=0.01~2.0;
P$_2$O$_5$/Al$_2$O$_3$=0.5~2.0;

$H_2O/Al_2O_3=21\sim200$;
$S/Al_2O_3=0.01\sim0.5$; S is surfactant;
$R/Al_2O_3=0.5\sim5.5$; R is diethylamine;

(2) said initial gel mixture is transferred into a synthetic kettle, then sealed and heated to crystallization temperature, and crystallized in the rotating conditions; wherein the crystallization temperature is 155~230° C., and the crystallization time is 1~72 h;

(3) after finishing the crystallization, the solid crystal product is washed and dried to obtain said metal silicoaluminophosphate molecular sieve with RHO framework structure.

In one preferable aspect, in step (1), said silicon source is one or more silicon sources selected from the group consisting of silica sol, silica gel, active silica, and orthosilicates; said aluminum source is one or more aluminum sources selected from the group consisting of aluminum salt, activated alumina, aluminum alkoxide and pseudoboehmite; said phosphorus source is one or more phosphorus sources selected from the group consisting of phosphoric acid, phosphates, organophosphorous compounds, and phosphorus oxides; said surfactant is one or more surfactants selected from the group consisting of dodecyl trimethyl ammonium chloride, dodecyl trimethyl ammonium bromide, tridecyl trimethyl ammonium chloride, tridecyl trimethyl ammonium bromide, tetradecyl trimethyl ammonium chloride, tetradecyl trimethyl ammonium bromide, pentadecyl trimethyl ammonium chloride, pentadecyl trimethyl ammonium bromide, hexadecyl trimethyl ammonium bromide, hexadecyl trimethyl ammonium chloride, dimethylhexadecyl[3-trimethylsilylpropyl]ammonium chloride, dimethyloctadecyl[3-trimethylsilylpropyl]ammonium chloride and hexadecyl(trimethoxy)silane.

In another preferable aspect, the metal source used in the step (1) is one or more metal sources selected from the group consisting of oxides, inorganic salts and organic salts of vanadium, copper, molybdenum, zirconium, cobalt, manganese, magnesium, iron, nickel or zinc.

In another preferable aspect, said metal source in the step (1) is one or more metal sources selected from the group consisting of oxides, inorganic salts and organic salts of copper, cobalt, manganese, magnesium, iron, nickel or zinc.

In another preferable aspect, said metal source in the step (1) is one or more metal sources selected from the group consisting of oxides, inorganic salts and organic salts of copper, cobalt, manganese, magnesium or zinc.

In another preferable aspect, the molar ratio of Me to $Al_2O_3$ in the step (1) is 0.01~0.5.

In another preferable aspect, the molar ratio of Me to $Al_2O_3$ in the step (1) is 0.02~0.35.

In another preferable aspect, the molar ratio of S to $Al_2O_3$ in the step (1) is 0.05~0.35.

In another preferable aspect, the molar ratio of R to $Al_2O_3$ in the step (1) is 1.0~4.0.

In another preferable aspect, R in the step (1) is a mixture of diethylamine and triethylamine, a mixture of diethylamine and morpholine or a mixture of diethylamine and tetraethyl ammonium hydroxide; wherein, the molar ratio of said diethylamine in the mixture is more than 70%.

In another preferable aspect, in the step (1), said initial gel mixture is obtained as the steps of: mixing ⅔ of said deionized water with phosphoric acid; adding said metal source and stirring 30 min to mix homogeneously; adding aluminum source and stirring 30 min to mix homogeneously; adding said silicon source; adding the solution of said surfactant in the rest ⅓ of said deionized water and stirring for 1 h; adding organic amine template and stirring for 1 hour to obtain said initial gel mixture.

In another preferable aspect, the crystallization time in step (2) is 2~48 h.

In another preferable aspect, the crystallization temperature in step (2) is 170~215° C.

Said MeAPSO molecular sieves with RHO framework structure after being calcined at 400~700° C. in the air can be used as a gas absorbent, a catalyst for the acid-catalyzed reaction or a catalyst for the oxidation reduction.

MeAPSO molecular sieve can be considered to obtain by doping of metal atoms into the framework of the SAPO molecular sieves. But MeAPSO molecular sieves can't be obtained by simply adding metal source into gel systems in synthesis process of SAPO molecular sieves. Firstly, for different metals and materials have different properties, to obtain the MeAPSO molecular sieves experimental design according to their properties are necessary. For example, in the synthesis of TS-1 zeolite, many raw materials contained titanium are difficult to enter into the framework of molecular sieves, due to their easy hydrolysis in the gel system of TS-1 zeolite. TS-1 zeolite is obtained by selecting the appropriate titanium source and optimizing the condition of synthesis. Secondly, the synthesis method of molecular sieves with different framework structures is different, so a known synthesis method of one MeAPSO molecular sieve can't be directly used to obtain another MeAPSO molecular sieve with different framework structure. Specific to the synthesis of MeAPSO-RHO molecular sieves, because the synthetic conditions of SAPO-RHO molecular sieves are rather strict (see patent application 200910169329 and article Micro. Meso. Mater. 144 (2011) 113-119), the content of silicon in synthesized product only can be adjusted in a narrow range, and the change of synthesis conditions easily lead to generate the miscellaneous crystals phase. Therefore, MeAPSO-RHO molecular sieves with pure phase are difficult to be obtained by simply adding metal source to the synthesized gel system, which often generate with CHA crystal phase, and the experimental reproducibility is not good. In our research, we found that the mix of raw materials in appropriate order can suppress the generation of miscellaneous crystals and obtain the pure phase of MeAPSO-RHO molecular sieves.

The present invention can bring the advantages as follows:

The present invention provides a new molecular sieve porous material.

(1) The present invention provides a synthesis method for the new molecular sieve material.
(2) The present invention provides a catalyst for acid-catalyzed reaction. For example, it can be used as the catalyst for the reaction of methanol to olefins or for the reaction of methanol and ammonia to methylamine.
(3) The present invention provides a catalyst for oxidation-reduction reaction.

The entrance of transition metal into the framework of SAPO molecular sieve brings the acidic performance and the redox performance for the molecular sieve which can be used as a catalyst for selective oxidation reaction. In our research, a high conversion rates of selective oxidation of straight-chain alkanes on MeAPSO-RHO molecular sieves were observed, which may be attributed to its unique framework structure. The easy variation of the valence of the transition metals in RHO framework is beneficial to the oxidation reaction.

(4) The present invention provides a gas adsorbent. Currently, molecular sieves used for study on adsorption and separation of gas mostly are zeolites composed of silicon and aluminum. We used the MeAPSO-RHO molecular sieves for the gas adsorbents according to their characteristics (eight-membered ring channel micropores, large pore volume and stronger acid sites generated by doping metal atoms into the molecular sieves framework). We found that the MeAPSO-RHO molecular sieves have great adsorption capacity for $CO_2$ (the stronger B acid site in molecular sieve is advantageous to the adsorption of $CO_2$), and have high adsorptive selectivity of $CO_2/CH_4$ and $CO_2/N_2$. So far, the use of MeAPSO molecular sieves for gas adsorption and separation has not been reported. Our study provides a new valuable application for MeAPSO molecular sieves.

BRIEF DESCRIPTION OF THE DRAWINGS

FIG. 1 is the adsorption isotherm (298K) for $CO_2$, $CH_4$ and $N_2$ of the sample obtained in Example 4.

EXAMPLES

The present invention will be described in details by Examples, but the present invention is not limited to these Examples.

Example 1

RHO-SAPO

The formulation ratios and the crystallization condition are shown in Table 1. The synthesis process of RHO-SAPO molecular sieve were as the following steps: 10 g of pseudo-boehmite ($Al_2O_3$ mass percent of 72.5%) were mixed homogeneously with 58 ml of deionized water, into which 16.4 g of ophosphoric acid ($H_3PO_4$ mass percent of 85 wt %) and 6.09 g of tetraethoxysilane were added in turn under stirring to obtain a gel system. 3.88 g of hexadecyl trimethyl ammonium bromide (CTAB) were dissolved in 60 ml of deionized water to obtain a solution. The solution was added to the gel system to obtain a mixture. Then the mixture was vigorously stirred to be mixed homogeneously. 10.38 g of diethylamine (DEA) were added into the mixture and stirring was continued until a homogeneous gel mixture was obtained. After being transferred and sealed into a stainless steel synthetic kettle, the gel mixture dynamically crystallized for 24 hours at 200° C. and autogenous pressure. After the crystallization, the solid product was centrifuged for separation and washed to neutral with deionized water and dried at 100° C. in the air to obtain said RHO-SAPO molecular sieve sample. XRD data of sample was shown in Table 2, indicating that the molecular sieve had RHO framework structure. The elemental composition of the sample was $Al_{0.50}P_{0.37}Si_{0.13}$ according to XRF analysis.

TABLE 1

The list of composition and crystallization conditions of the molecular sieve*

| Example | Organic amine | Metal source and amount | Amount of aluminum source | Amount of phosphorus source | Amount of silicon source | $H_2O$ | Surfactants and amount | Crystallization temperature | Crystallization time |
|---|---|---|---|---|---|---|---|---|---|
| 1 | Diethylamine 10.38 g | — | 10 g | 16.4 g | 6.09 g | 118 g | — | 200° C. | 24 h |
| 2 | Diethylamine 10.38 g | $Fe(NO_3)_3 \cdot 9H_2O$ 4.3 g | 20 g[a] | 16.4 g | 6.09 g[b] | 118 g | CTAB 3.88 g | 200° C. | 24 h |
| 3 | Diethylamine 10.38 g | $Mg(NO_3)_2 \cdot 6H_2O$ 2.73 g | 7.8 g[c] | 16.4 g | 4.0 g | 118 g | CTAB 3.88 g | 200° C. | 24 h |
| 4 | Diethylamine 10.38 g | $Zn(NO_3)_2 \cdot 6H_2O$ 3.17 g | 10 g | 16.4 g | 2.0 g[d] | 118 g | CTAB 3.88 g | 200° C. | 24 h |
| 5 | Diethylamine 10.38 g | $Mn(C_2H_3O_2)_2 \cdot 4H_2O$ 2.61 g | 20 g[a] | 16.4 g | 6.09 g | 118 g | CTAB 3.88 g | 200° C. | 24 h |
| 6 | Diethylamine 10.38 g | $CoSO_4 \cdot 7H_2O$ 3.0 g | 10 g | 20.0 g | 6.09 g | 118 g | CTAB 3.88 g | 200° C. | 24 h |
| 7 | Diethylamine 10.38 g | $CuCl_2 \cdot 2H_2O$ 1.82 g | 10 g | 16.4 g | 12.0 g | 118 g | CTAB 3.88 g | 230° C. | 1 h |
| 8 | Diethylamine 10.38 g | $Ni(NO_3)_2 \cdot 6H_2O$ 3.10 g | 10 g | 16.4 g | 6.09 g | 118 g | CTAB 3.88 g | 200° C. | 24 h |
| 9 | Diethylamine 10.38 g | $Ni_2O_3$ 0.6 g | 10 g | 16.4 g | 6.09 g | 118 g | CTAB 3.88 g | 200° C. | 24 h |
| 10 | Diethylamine 10.38 g | $Ni(NO_3)_2 \cdot 6H_2O$ 13.0 g | 10 g | 16.4 g | 6.09 g | 118 g | CTAB 3.88 g | 200° C. | 24 h |
| 11 | Diethylamine 10.38 g | $Ni(NO_3)_2 \cdot 6H_2O$ 3.10 g | 10 g | 16.4 g | 6.09 g | 118 g | CTAB 2.0 g | 215° C. | 2 h |
| 12 | Diethylamine 10.38 g | $Ni(NO_3)_2 \cdot 6H_2O$ 3.10 g | 10 g | 16.4 g | 6.09 g | 178 g | CTAB 7.5 g | 185° C. | 40 h |
| 13 | Diethylamine 7.7 g | $Ni(NO_3)_2 \cdot 6H_2O$ 3.10 g | 10 g | 16.4 g | 6.09 g | 118 g | CTAB 3.88 g | 200° C. | 24 h |
| 14 | Diethylamine 20 g | $Ni(NO_3)_2 \cdot 6H_2O$ 3.10 g | 10 g | 16.4 g | 6.09 g | 118 g | CTAB 3.88 g | 155° C. | 72 h |
| 15 | Diethylamine 10.38 g | $Ni(NO_3)_2 \cdot 6H_2O$ 3.10 g | 10 g | 16.4 g | 6.09 g | 40 g | CTAB 3.88 g | 170° C. | 48 h |

*The aluminum source was pseudoboehmite ($Al_2O_3$ mass percent of 72.5%); the phosphorus source was phosphoric acid ($H_3PO_4$ mass percent of 85%); the silicon source was tetraethoxysilane;
[a]the aluminum source was aluminium isopropoxide;
[b]the silicon source was ludox($SiO_2$ mass percent of 30%);
[c]The aluminum source was γ-alumina, mass percent of $Al_2O_3$ was 93%;
[d]the silicon source was fumed silica ($SiO_2$ mass percent of 93%).

TABLE 2

XRD result of the sample obtained in Example 1

| No. | 2θ | d(Å) | 100 × I/I₀ |
|---|---|---|---|
| 1 | 8.224 | 10.7382 | 100 |
| 2 | 11.692 | 7.5598 | 10 |
| 3 | 14.327 | 6.1748 | 69 |
| 4 | 26.554 | 3.3528 | 24 |
| 5 | 18.509 | 4.7880 | 25 |
| 6 | 20.311 | 4.3671 | 6 |
| 7 | 21.943 | 4.0458 | 37 |
| 8 | 23.473 | 3.7854 | 12 |
| 9 | 24.918 | 3.5691 | 50 |
| 10 | 26.295 | 3.3852 | 63 |
| 11 | 28.862 | 3.0897 | 18 |
| 12 | 30.052 | 2.9700 | 32 |
| 13 | 32.347 | 2.7643 | 24 |
| 14 | 35.543 | 2.5228 | 16 |
| 15 | 42.173 | 2.1402 | 2 |
| 16 | 43.907 | 2.0596 | 5 |
| 17 | 47.222 | 1.9225 | 7 |
| 18 | 48.021 | 1.8923 | 6 |
| 19 | 48.837 | 1.8626 | 2 |

TABLE 3

XRD result of the sample obtained in Example 2

| No. | 2θ | d(Å) | 100 × I/I₀ |
|---|---|---|---|
| 1 | 8.224 | 10.7382 | 100 |
| 2 | 11.658 | 7.5817 | 7 |
| 3 | 14.276 | 6.1967 | 58 |
| 4 | 16.503 | 5.3652 | 25 |
| 5 | 18.475 | 4.7967 | 20 |
| 6 | 20.311 | 4.3671 | 4 |
| 7 | 21.892 | 4.0551 | 31 |
| 8 | 23.456 | 3.7881 | 9 |
| 9 | 24.884 | 3.5739 | 40 |
| 10 | 26.244 | 3.3917 | 55 |
| 11 | 28.811 | 3.0951 | 15 |
| 12 | 30.018 | 2.9733 | 24 |
| 13 | 32.313 | 2.7672 | 18 |
| 14 | 35.492 | 2.5263 | 13 |
| 15 | 43.958 | 2.0574 | 3 |
| 16 | 47.154 | 1.9251 | 5 |
| 17 | 47.987 | 1.8936 | 4 |
| 18 | 48.786 | 1.8644 | 2 |

TABLE 4

XRD result of the sample obtained in Example 3

| No. | 2θ | d(Å) | 100 × I/I₀ |
|---|---|---|---|
| 1 | 8.224 | 10.7382 | 100 |
| 2 | 11.641 | 7.5928 | 6 |
| 3 | 14.276 | 6.1967 | 54 |
| 4 | 16.503 | 5.3652 | 25 |
| 5 | 18.458 | 4.8011 | 23 |
| 6 | 20.260 | 4.3779 | 5 |
| 7 | 21.892 | 4.0551 | 33 |
| 8 | 23.422 | 3.7936 | 10 |
| 9 | 24.867 | 3.5763 | 30 |
| 10 | 26.227 | 3.3939 | 60 |
| 11 | 28.794 | 3.0969 | 15 |
| 12 | 29.984 | 2.9766 | 30 |
| 13 | 32.279 | 2.7700 | 22 |
| 14 | 35.458 | 2.5286 | 15 |
| 15 | 42.071 | 2.1452 | 2 |
| 16 | 43.805 | 2.0642 | 5 |
| 17 | 47.103 | 1.9271 | 6 |
| 18 | 47.902 | 1.8968 | 6 |
| 19 | 48.718 | 1.8669 | 2 |

TABLE 5

XRD result of the sample obtained in Example 4

| No. | 2θ | d(Å) | 100 × I/I₀ |
|---|---|---|---|
| 1 | 8.224 | 10.7382 | 100 |
| 2 | 11.641 | 7.5928 | 8 |
| 3 | 14.276 | 6.1967 | 60 |
| 4 | 16.503 | 5.3652 | 20 |
| 5 | 18.458 | 4.8011 | 28 |
| 6 | 20.260 | 4.3779 | 5 |
| 7 | 21.892 | 4.0551 | 36 |
| 8 | 23.422 | 3.7936 | 10 |
| 9 | 24.867 | 3.5763 | 39 |
| 10 | 26.227 | 3.3939 | 55 |
| 11 | 28.794 | 3.0969 | 15 |
| 12 | 29.984 | 2.9766 | 26 |
| 13 | 32.279 | 2.7700 | 22 |
| 14 | 35.458 | 2.5286 | 15 |
| 15 | 42.071 | 2.1452 | 2 |
| 16 | 43.805 | 2.0642 | 4 |
| 17 | 47.103 | 1.9271 | 5 |
| 18 | 47.902 | 1.8968 | 5 |
| 19 | 48.718 | 1.8669 | 2 |

Examples 2-15

RHO-MeAPSO

The formulation ratios and the crystallization condition are shown in Table 1. The synthesis process of RHO-MeAPSO molecular sieve was as the following steps: ⅔ of the deionized water was mixed homogeneously with phosphoric acid, into which metal source was added with stirring for 30 min to obtain the mixture I. The silicon source was added into the mixture I with stirring for 30 min to obtain the mixture II. The surfactants were dissolved in the rest ⅓ of the deionized water to obtain a solution. The solution was added to the mixture II with stirring for 2 h to obtain the mixture III. The organic amine template was added into the mixture III and stirring was continued until a homogeneous gel mixture was obtained. After being transferred and sealed into a stainless steel synthetic kettle, the gel mixture dynamically crystallized for some time at a certain temperature. After the crystallization, the solid product was centrifuged for separation and washed to neutral with deionized water and dried at 100° C. in the air. The raw powder samples containing template agent of said MeAPSO molecular sieves were obtained. XRD data of samples obtained in examples 2-8 were shown in Table 3-9, indicating that all of the molecular sieves had RHO framework structure. These results showed that the relative intensity of the diffraction peaks in tables were change compared to Table 1, indicating the change of the interplanar crystal spacing brought by the entrance of metal atoms into the framework of the molecular sieve. XRD results of the samples obtained in Examples 9-14 were similar to the sample obtained in Example 8.

The sample obtained in Example 2 was analyzed by the elementary analysis of CHN and XRF, whose chemical composition in the anhydrous state is expressed as $0.18(DEA) \cdot 0.06Fe \cdot (Al_{0.50}P_{0.37}Si_{0.13})O_2$.

The chemical composition in the anhydrous state of samples obtained in Examples 3-10 was analyzed by XRF respectively, and expressed as follow:
$0.08Mg \cdot (Al_{0.48}P_{0.41}Si_{0.11})O_2$; $0.10Zn \cdot (Al_{0.47}P_{0.40}Si_{0.13})O_2$; $0.08Mn \cdot (Al_{0.48}P_{0.39}Si_{0.13})O_2$;
$0.07Co \cdot (Al_{0.50}P_{0.37}Si_{0.13})O_2$; $0.07Cu \cdot (Al_{0.47}P_{0.33}Si_{0.20})O_2$; $0.08Ni \cdot (Al_{0.50}P_{0.37}Si_{0.13})O_2$;
$0.02Ni \cdot (Al_{0.49}P_{0.38}Si_{0.13})O_2$; $0.23Ni \cdot (Al_{0.50}P_{0.37}Si_{0.13})O_2$.

TABLE 6

XRD result of the sample obtained in Example 5

| No. | 2θ | d(Å) | 100 × I/I₀ |
|---|---|---|---|
| 1 | 8.224 | 10.7382 | 100 |
| 2 | 11.641 | 7.5928 | 6 |
| 3 | 14.276 | 6.1967 | 58 |
| 4 | 16.503 | 5.3652 | 20 |
| 5 | 18.458 | 4.8011 | 25 |
| 6 | 20.260 | 4.3779 | 5 |
| 7 | 21.892 | 4.0551 | 30 |
| 8 | 23.422 | 3.7936 | 10 |
| 9 | 24.867 | 3.5763 | 40 |
| 10 | 26.227 | 3.3939 | 54 |
| 11 | 28.794 | 3.0969 | 14 |
| 12 | 29.984 | 2.9766 | 31 |
| 13 | 32.279 | 2.7700 | 20 |
| 14 | 35.458 | 2.5286 | 14 |
| 15 | 42.071 | 2.1452 | 2 |
| 16 | 43.805 | 2.0642 | 5 |
| 17 | 47.103 | 1.9271 | 6 |
| 18 | 47.902 | 1.8968 | 6 |
| 19 | 48.718 | 1.8669 | 2 |

TABLE 7

XRD result of the sample obtained in Example 6

| No. | 2θ | d(Å) | 100 × I/I₀ |
|---|---|---|---|
| 1 | 8.224 | 10.7382 | 100 |
| 2 | 11.641 | 7.5928 | 7 |
| 3 | 14.276 | 6.1967 | 62 |
| 4 | 16.503 | 5.3652 | 21 |
| 5 | 18.458 | 4.8011 | 24 |
| 6 | 20.260 | 4.3779 | 5 |
| 7 | 21.892 | 4.0551 | 31 |
| 8 | 23.422 | 3.7936 | 10 |
| 9 | 24.867 | 3.5763 | 36 |
| 10 | 26.227 | 3.3939 | 60 |
| 11 | 28.794 | 3.0969 | 17 |
| 12 | 29.984 | 2.9766 | 30 |
| 13 | 32.279 | 2.7700 | 24 |
| 14 | 35.458 | 2.5286 | 15 |
| 15 | 42.071 | 2.1452 | 2 |
| 16 | 43.805 | 2.0642 | 4 |
| 17 | 47.103 | 1.9271 | 6 |
| 18 | 47.902 | 1.8968 | 6 |
| 19 | 48.718 | 1.8669 | 1 |

TABLE 8

XRD result of the sample obtained in Example 7

| No. | 2θ | d(Å) | 100 × I/I₀ |
|---|---|---|---|
| 1 | 8.224 | 10.7382 | 100 |
| 2 | 11.641 | 7.5928 | 8 |
| 3 | 14.276 | 6.1967 | 65 |
| 4 | 16.503 | 5.3652 | 20 |
| 5 | 18.458 | 4.8011 | 25 |
| 6 | 20.260 | 4.3779 | 5 |
| 7 | 21.892 | 4.0551 | 35 |
| 8 | 23.422 | 3.7936 | 10 |
| 9 | 24.867 | 3.5763 | 41 |
| 10 | 26.227 | 3.3939 | 60 |
| 11 | 28.794 | 3.0969 | 18 |
| 12 | 29.984 | 2.9766 | 20 |
| 13 | 32.279 | 2.7700 | 20 |
| 14 | 35.458 | 2.5286 | 15 |
| 15 | 42.071 | 2.1452 | 3 |
| 16 | 43.805 | 2.0642 | 5 |
| 17 | 47.103 | 1.9271 | 6 |
| 18 | 47.902 | 1.8968 | 6 |
| 19 | 48.718 | 1.8669 | 2 |

TABLE 9

XRD result of the sample obtained in Example 8

| No. | 2θ | d(Å) | 100 × I/I₀ |
|---|---|---|---|
| 1 | 8.224 | 10.7382 | 100 |
| 2 | 11.641 | 7.5928 | 8 |
| 3 | 14.276 | 6.1967 | 60 |
| 4 | 16.503 | 5.3652 | 22 |
| 5 | 18.458 | 4.8011 | 23 |
| 6 | 20.260 | 4.3779 | 5 |
| 7 | 21.892 | 4.0551 | 33 |
| 8 | 23.422 | 3.7936 | 10 |
| 9 | 24.867 | 3.5763 | 39 |
| 10 | 26.227 | 3.3939 | 50 |
| 11 | 28.794 | 3.0969 | 16 |
| 12 | 29.984 | 2.9766 | 36 |
| 13 | 32.279 | 2.7700 | 22 |
| 14 | 35.458 | 2.5286 | 17 |
| 15 | 42.071 | 2.1452 | 3 |
| 16 | 43.805 | 2.0642 | 5 |
| 17 | 47.103 | 1.9271 | 6 |
| 18 | 47.902 | 1.8968 | 6 |
| 19 | 48.718 | 1.8669 | 3 |

Example 16

The formulation ratio, the synthesis process and the crystallization condition were the same as Example 2, except that organic amine template was changed to 7.76 g of diethylamine and 3.1 g of morpholine. After the crystallization, the solid product was centrifuged for separation and washed to neutral with deionized water and dried at 100° C. in the air. The FeAPSO molecular sieve was obtained. XRD data of sample is similar to the sample obtained in Example 2, indicating that the synthesized molecular sieves had the RHO framework structure.

Example 17

The formulation ratio, the synthesis process and the crystallization condition were the same as Example 2, except that organic amine template was changed to 9.5 g of diethylamine and 3.6 g of triethylamine. After the crystallization, the solid product was centrifuged for separation and washed to neutral with deionized water and dried at 100° C. in the air. The FeAPSO molecular sieve was obtained. XRD data of sample is similar to the sample obtained in Example 2, indicating that the synthesized molecular sieves had the RHO framework structure.

Example 18

R Type Variable

The formulation ratio, the synthesis process and the crystallization condition were the same as Example 5, except that surfactant was changed to 4 g of dimethylhexadecyl[3-trimethylsilylpropyl]ammonium chloride. After the crystallization, the solid product was centrifuged for separation and washed to neutral with deionized water and dried at 100° C. in the air. The MnAPSO molecular sieve was obtained. XRD data of sample is similar to the sample obtained in Example 5, indicating that the synthesized molecular sieves had the RHO framework structure.

Example 19

The formulation ratio, the synthesis process and the crystallization condition were the same as Example 5, except that surfactant was changed to 4 g of dodecyl trimethyl ammonium chloride. After the crystallization, the solid product was centrifuged for separation and washed to neutral with deionized water and dried at 100° C. in the air. Said MnAPSO molecular sieve was obtained. XRD data of samples were similar to Example 5, indicating that the synthesized molecular sieves had the RHO framework structure.

Example 20

The formulation ratio, the synthesis process and the crystallization condition were the same as Example 5, except that surfactant was changed to 4 g of tetradecyl trimethyl ammonium chloride. After the crystallization, the solid product was centrifuged for separation and washed to neutral with deionized water and dried at 100° C. in the air. The MnAPSO molecular sieve was obtained. XRD data of sample is similar to the sample obtained in Example 5, indicating that the synthesized molecular sieves had the RHO framework structure.

Comparative Example 1

The formulation ratio and the crystallization condition were the same as Example 2, the synthesis process was as follow: the aluminum source was mixed with ½ of the deionized water, into which phosphorus source and silicon source metal source were added under stirring to obtain mixture I. Hexadecyl trimethyl ammonium bromide (CTAB) were dissolved in ¼ of the deionized water and added into mixture I, and stirring was continued until a homogeneous Mixture A was obtained. The metal source (analytically pure) was dissolved in the rest of the deionized water under stirring. Then the solution was added into the Mixture A to obtain gel system. Finally, diethylamine was added into the gel system, and stirring was continued until a homogeneous gel mixture was obtained. After being transferred and sealed into a stainless steel synthetic kettle, the gel mixture dynamically crystallized for some time at a certain temperature. After the crystallization, the solid product was centrifuged for separation and washed to neutral with deionized water and dried at 100° C. in the air. Said product was obtained. The product was analyzed by XRD, and the data showed that the main crystal phase of the product was RHO, mixing with some CHA.

Comparative Example 2

The formulation ratio and the crystallization condition were the same as Example 3, the synthesis process was as follow: the aluminum source was mixed with ½ of the deionized water, into which phosphorus source and silicon source were added under stirring to obtain mixture I. Hexadecyl trimethyl ammonium bromide (CTAB) was dissolved in ¼ of deionized water and added into mixture I, and stirring was continued until a homogeneous Mixture A was obtained. The metal source (analytically pure) was dissolved in the rest of the deionized water under stirring. Then the solution was added into the Mixture A to obtain gel system. Finally, diethylamine was added into the gel system, and stirring was continued until a homogeneous gel mixture was obtained. After being transferred and sealed into a stainless steel synthetic kettle, the gel mixture dynamically crystallized for some time at a certain temperature. After the crystallization, the solid product was centrifuged for separation and washed to neutral with deionized water and dried at 100° C. in the air. Said product was obtained. The product was analyzed by XRD, and the data showed that the main crystal phase of the product was RHO, mixing with some CHA phase.

Example 21

The sample obtained in Example 3 was calcined at 600° C. for 4 hours under air, then pressed, crushed and sieved to 20-40 mesh. 1.0 g of a sample was weighted and loaded into a fixed bed reactor to carry out a MTO reaction evaluation. The sample was activated at 550° C. for 1 hour under nitrogen gas and reduced to 450° C. to perform a reaction. Methanol was carried by nitrogen gas with a flow rate of 40 ml/min and the weight space rate of the methanol was 2.0 $h^{-1}$. The reaction products were analyzed by an on-line gas chromatograph (Varian3800, FID detector, capillary column was PoraPLOT Q-HT). The results were shown in Table 10.

TABLE 10

The reaction result of methanol to olefins on the sample obtained in example 3

| Sample | Life (min) | Selective (mass %)* | | | | | | | |
|---|---|---|---|---|---|---|---|---|---|
| | | $CH_4$ | $C_2H_4$ | $C_2H_6$ | $C_3H_6$ | $C_3H_8$ | $C_4^+$ | $C_5^+$ | $C_2H_4 + C_3H_6$ |
| Example 3 | 60 | 3.1 | 41.8 | 1.5 | 36.7 | 4.0 | 10.8 | 2.1 | 78.5 |

*The highest (ethylene + propylene) selectivity when methanol conversion was 100%.

Example 22

The sample obtained in Example 4 was used for $CO_2$ adsorbent. The adsorption isotherm of the sample was detected by ASAP2020 of US Micromeritics. The adsorbed gases were $CO_2$(99.99%), $CH_4$(99.99%) and $N_2$(99.99%). In order to avoid the influence of physical absorb water in molecular sieve, the sample was calcined at 600° C. for 4 hours before the adsorption isotherm detection. Then the sample was heated to 350° C. at the rate of 1° C./min in an extremely low vacuum ($5 \times 10^{-3}$ mmHg) and kept for 8 hours. The adsorbent temperature was 298K and controlled by thermostatic water bath (accuracy: ±0.05° C.). The result was shown in FIG. 1. The adsorption capacity of the sample to $CO_2$, $CH_4$ and $N_2$ were 4.65, 0.38 and 0.23 mmol/g (at 101 kPa) respectively. The adsorption selectivity were $CO_2/CH_4$=12.5 and $CO_2/N_2$=19.8.

The sample after the adsorption was vacuumed at room temperature for 30 min by ASAP2020, and then detected again for the adsorption isotherm. The adsorption capacity of the sample to $CO_2$, $CH_4$ and $N_2$ were 4.65, 0.38 and 0.23 mmol/g (at 101 kPa) respectively. The result indicated that the sample had good regeneration performance which can be regenerated under very mild conditions.

Example 23

The sample obtained in Example 10 was used for $CO_2$ adsorbent. The adsorption isotherm of the sample was detected by ASAP2020 of US Micromeritics. The adsorbed gases were $CO_2$(99.99%), $CH_4$(99.99%) and $N_2$(99.99%). In order to avoid the influence of physical absorb water in molecular sieve, the sample was calcined at 600° C. for 4 hours before the adsorption isotherm detection. Then the sample was heated to 350° C. at the rate of 1° C./min in an extremely low vacuum ($5\times10^{-3}$ mmHg) and kept for 8 hours. The adsorbent temperature was 298K and controlled by thermostatic water bath (accuracy: ±0.05° C.). The result indicated that the adsorption capacity of the sample to $CO_2$, $CH_4$ and $N_2$ were 4.9, 0.38 and 0.22 mmol/g (at 101 kPa) respectively. The adsorption selectivity were $CO_2/CH_4$=12.9 and $CO_2/N_2$=22.3.

The sample after the adsorption was vacuumed at room temperature for 30 min by ASAP2020, and then detected again for the adsorption isotherm. The adsorption capacity of the sample to $CO_2$, $CH_4$ and $N_2$ were 4.95, 0.36 and 0.23 mmol/g (at 101 kPa) respectively. The result indicated that the sample had good regeneration performance which can be regenerated under very mild conditions.

ing to the literature method (Catalysis Today, V93-95 (2004) 735-742), the CoAPSO-34 and CoAPSO-11 molecular sieves were synthesized as contrast samples. The elemental composition of CoAPSO-34 and CoAPSO-11 analyzed by XRF were $0.09Co.(Al_{0.50}P_{0.40}Si_{0.10})O_2$ and $0.09Co.(Al_{0.50}P_{0.42}Si_{0.08})O_2$.

The reaction process was as follows of: adding 1 g of the catalyst calcinated to the 100 ml stainless steel reaction kettle with polytetrafluoroethylene lining; adding 30 g of the reaction substrate; adding a small quantity of tert-butyl hydroperoxide as reaction initiator and 1 g of toluene as the internal standard; sealing the reaction kettle and filling 1 MPa oxygen; heating the reaction kettle to 120° C. (about 25 min) by the heating jacket under stirring; after reaction for 24 hours, cooling the reaction kettle with water. The reaction kettle cover was opened and 20 ml of ethanol were added to dissolve the carboxylic acid, then the sample was toke out under string. The product was qualitative analyzed by HP 6890 GC-MS, using the capillary column of INNOwax (0.25 mm×30 m). The quantitative analysis of the product was operated on Varian 3800 gas chromatograph, using the capillary column of Varian FFAP (0.53 mm×20 m). The result was shown in Table 11.

The results showed that the octane conversion on the sample in Example 6 was the highest than the other. The reason is speculated that the unique framework structure of MeAPSO-RHO make the variation of valence of the transition metals easier. Moreover, the MeAPSO-RHO molecular sieve had bigger pore volume and surface area (Micro. Meso. Mater. 144(2011)113-119) which provided more catalytic active site for the reaction.

TABLE 11

The results of Octane oxidation reaction

| | | Product distribution (molar proportion %)[a] | | | | | | | | | | |
|---|---|---|---|---|---|---|---|---|---|---|---|---|
| Catalyst | Conversion (%) | 4-ketone | 3-ketone | 2-ketone | aldehyde | 4-alcohol | 3-alcohol | 2-alcohol | PA | BA | other | ketone/alcohol |
| Example 6 | 18.9 | 13.6 | 15.6 | 18.1 | 1.4 | 5.5 | 6.1 | 7.0 | 1.7 | 15.0 | 16.0 | 2.6 |
| CoAPSO-34 | 12.8 | 13.2 | 15.3 | 17.8 | 2.1 | 4.7 | 5.3 | 6.6 | 2.3 | 12.9 | 19.8 | 2.9 |
| CoAPSO-11 | 12.8 | 10.4 | 12.8 | 14.9 | 0.8 | 5.2 | 5.8 | 7.0 | 5.3 | 18.7 | 19.1 | 2.1 |
| Example 1 | 4.8 | 11.8 | 13.9 | 16.0 | — | 5.8 | 6.9 | 8.4 | 5.2 | 22.4 | 9.6 | 2.0 |

[a]ketone = -octanone, -alcohol = -octanol, PA = propionic acid, BA = butyric acid, other = mostly were broken oxide, a few were oxide with more than one functional group.

Comparative Example 3

According to the literature method (Catalysis Today V93-95 (2004) 735-742), the ZnAPSO-34 sample was synthesized using zinc nitrate as zinc source. Element composition of the sample by XRF analysis was $0.11Zn.(Al_{0.48}P_{0.40}Si_{0.12})O_2$. The gas adsorbent property of ZnAPSO-34 sample was measured.

The method of the adsorption isotherm detection was the same as Example 22. The adsorption capacity of the sample to $CO_2$, $CH_4$ and $N_2$ were 3.75, 0.42 and 0.32 mmol/g (at 101 kPa) respectively. The adsorption selectivity were $CO_2/CH_4$=8.9 and $CO_2/N_2$=11.7.

Example 24

The sample obtained in Example 6 was calcinated at 600° C. for 4 hours in air, and then used as catalyst for n-octane liquid phase oxidation reaction. The sample in Example 1 was used as catalyst for contrast sample. Moreover, accord-

The invention claimed is:

1. A metal silicoaluminophosphate molecular sieve with RHO framework structure whose chemical composition in the anhydrous state is expressed as:

$$mR.nMe.(Si_xAl_yP_z)O_2,$$

where,

R represents template existing in micropores of said metal silicoaluminophosphate molecular sieve;

m is the molar number of said template per one mole of $(Si_xAl_yP_z)O_2$, m=0.1~0.5;

Me represents metal atom entering into said metal silicoaluminophosphate molecular sieve framework, n is the molar number of Me per one molar of $(Si_xAl_yP_z)O_2$, n=0.001~0.30;

x, y, z respectively represents the molar number of Si, Al, P, wherein x=0.01~0.60, y=0.2~0.60, z=0.2~0.60, and x+y+z=1.

2. A metal silicoaluminophosphate molecular sieve according to claim 1, characterized in that said template R is diethylamine, a mixture of diethylamine and triethylamine, a mixture of diethylamine and morpholine or a mixture of diethylamine and tetraethylammonium hydroxide.

3. A metal silicoaluminophosphate molecular sieve according to claim 1, characterized in that said template R is a mixture of diethylamine and triethylamine, a mixture of diethylamine and morpholine or a mixture of diethylamine and tetraethyl ammonium hydroxide; wherein the molar ratio of said diethylamine in the mixture is more than 70%.

4. A metal silicoaluminophosphate molecular sieve according to claim 1, characterized in that said metal atom Me entering into said metal silicoaluminophosphate molecular sieve framework is one or more metal atoms selected from the group consisting of vanadium, copper, molybdenum, zirconium, cobalt, manganese, magnesium, iron, nickel and zinc.

5. A metal silicoaluminophosphate molecular sieve of claim 4, wherein said metal atom Me is one or more metal atoms selected from the group consisting of copper, cobalt, manganese, magnesium, iron, nickel and zinc.

6. A metal silicoaluminophosphate molecular sieve of claim 4, wherein said metal atom Me is one or more metal atoms selected from the group consisting of copper, cobalt, manganese, magnesium and zinc.

7. A method for preparing said metal silicoaluminophosphate molecular sieve according to claim 1, including the steps as following:
(1) a metal source, a silicon source, an aluminum source, a phosphorus source, a surfactant, a template and deionized water are mixed homogeneously by stirring, and an initial gel mixture with following molar ratio is obtained:
$Me/Al_2O_3=0.01~1.0$;
$SiO_2/Al_2O_3=0.01~2.0$;
$P_2O_5/Al_2O_3=0.5~2.0$;
$H_2O/Al_2O_3=21~200$;
$S/Al_2O_3=0.01~0.5$; S represents at least one surfactant;
$R/Al_2O_3=0.5~5.5$; R is diethylamine, a mixture of diethylamine and triethylamine, a mixture of diethylamine and morpholine or a mixture of diethylamine and tetraethylammonium hydroxide;
(2) said initial gel mixture is transferred into a synthetic kettle, then sealed and heated to crystallization temperature, and crystallized in the rotating conditions; wherein the crystallization temperature is 155~230° C., and the crystallization time is 1~72 h;
(3) after finishing the crystallization, the solid crystal product is washed and dried to obtain said metal silicoaluminophosphate molecular sieve with RHO framework structure.

8. A method according to claim 7, characterized in that said silicon source is one or more silicon sources selected from the group consisting of silica sol, silica gel, active silica, and orthosilicates;
said aluminum source is one or more aluminum sources selected from the group consisting of aluminum salts, activated alumina, aluminum alkoxide and pseudoboehmite;
said phosphorus source is one or more phosphorus sources selected from the group consisting of phosphoric acid, phosphate, organophosphorous compounds, and phosphorus oxides;
said surfactant is one or more surfactants selected from the group consisting of dodecyl trimethyl ammonium chloride, dodecyl trimethyl ammonium bromide, tridecyl trimethyl ammonium chloride, tridecyl trimethyl ammonium bromide, tetradecyl trimethyl ammonium chloride, tetradecyl trimethyl ammonium bromide, pentadecyl trimethyl ammonium chloride, pentadecyl trimethyl ammonium bromide, hexadecyl trimethyl ammonium bromide, hexadecyl trimethyl ammonium chloride, dimethylhexadecyl [3-trimethylsilylpropyl] ammonium chloride, dimethyloctadecyl [3-trimethylsilylpropyl] ammonium chloride and hexadecyl (trimethoxy)silane.

9. A method according to claim 7, characterized in that said metal source is one or more metal sources selected from the group consisting of oxides, inorganic salts and organic salts of vanadium, copper, molybdenum, zirconium, cobalt, manganese, magnesium, iron, nickel or zinc.

10. A method according to claim 7, wherein said metal source is one or more metal atoms selected from the group consisting of copper, cobalt, manganese, magnesium, iron, nickel and zinc.

11. A method according to claim 7, wherein said metal source is one or more metal atoms selected from the group consisting of copper, cobalt, manganese, magnesium and zinc.

12. A method according to claim 7, characterized in that the molar ratio of Me to Al2O3 in the step (1) is 0.01~0.35.

13. A method according to claim 7, characterized in that the molar ratio of Me to $Al_2O_3$ in the step (1) is 0.01~0.5.

14. A method according to claim 7, characterized in that the molar ratio of S to $Al_2O_3$ in the step (1) is 0.05~0.35.

15. A method according to claim 7, characterized in that the molar ratio of R to $Al_2O_3$ in the step (1) is 1.0~4.0.

16. A method according to claim 7, characterized in that R in the step (1) is a mixture of diethylamine and triethylamine, a mixture of diethylamine and morpholine or a mixture of diethylamine and tetraethyl ammonium hydroxide; wherein, the molar ratio of said diethylamine in the mixture is more than 70%.

17. A method according to claim 7, characterized in that in the step (1), said initial gel mixture is obtained as the following steps of: mixing ⅔ of said deionized water with phosphoric acid; adding said metal source and stirring to mix homogeneously; adding aluminum source and stirring to mix homogeneously; adding said silicon source; adding the solution of said surfactant in the rest ⅓ of said deionized water and stirring for at least 1 h; adding organic amine template and stirring for at least 1 hour to obtain said initial gel mixture.

18. A method according to claim 7, characterized in that the crystallization temperature in step (2) is 170~215° C., and the crystallization time is 2~48 hours.

19. A catalyst for acid-catalyzed reaction, which is obtained by calcining at least one of said metal silicoaluminophosphate molecular sieves according to claim 1 at 400~700° C. in the air.

20. A gas absorbent, which is obtained by calcining at least one of said metal silicoaluminophosphate molecular sieves according to claim 1 at 400~700° C. in the air.

21. A catalyst for selective oxidation reaction, which is obtained by calcining at least one of said metal silicoaluminophosphate molecular sieves according to claim 1 at 400~700° C. in the air.

* * * * *